Jan. 19, 1932.  E. C. TAYLOR  1,841,506
SHUTTLE MECHANISM FOR WRAPPING MACHINES
Filed Oct. 17, 1927   3 Sheets-Sheet 1
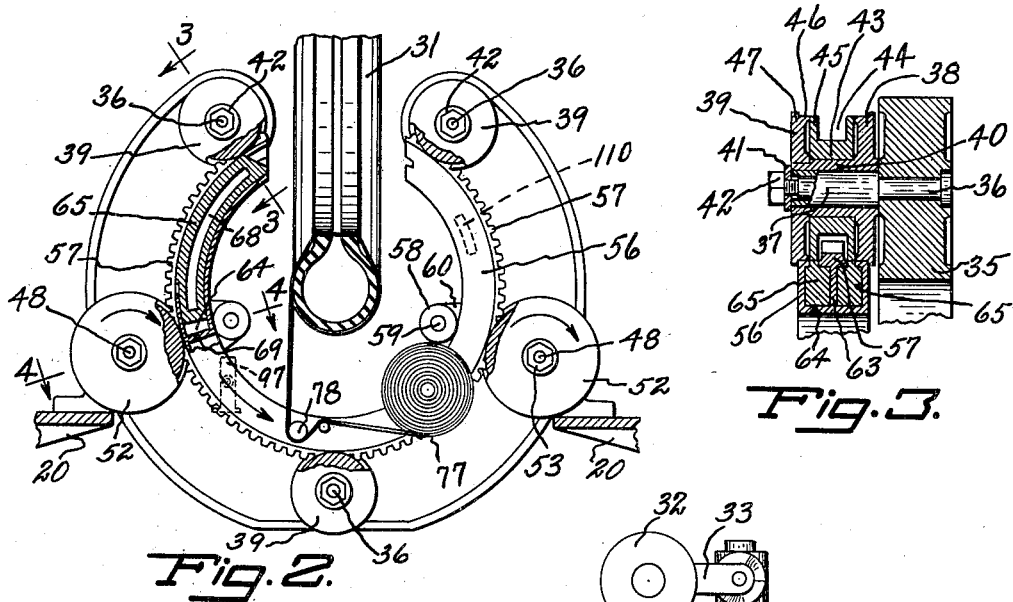
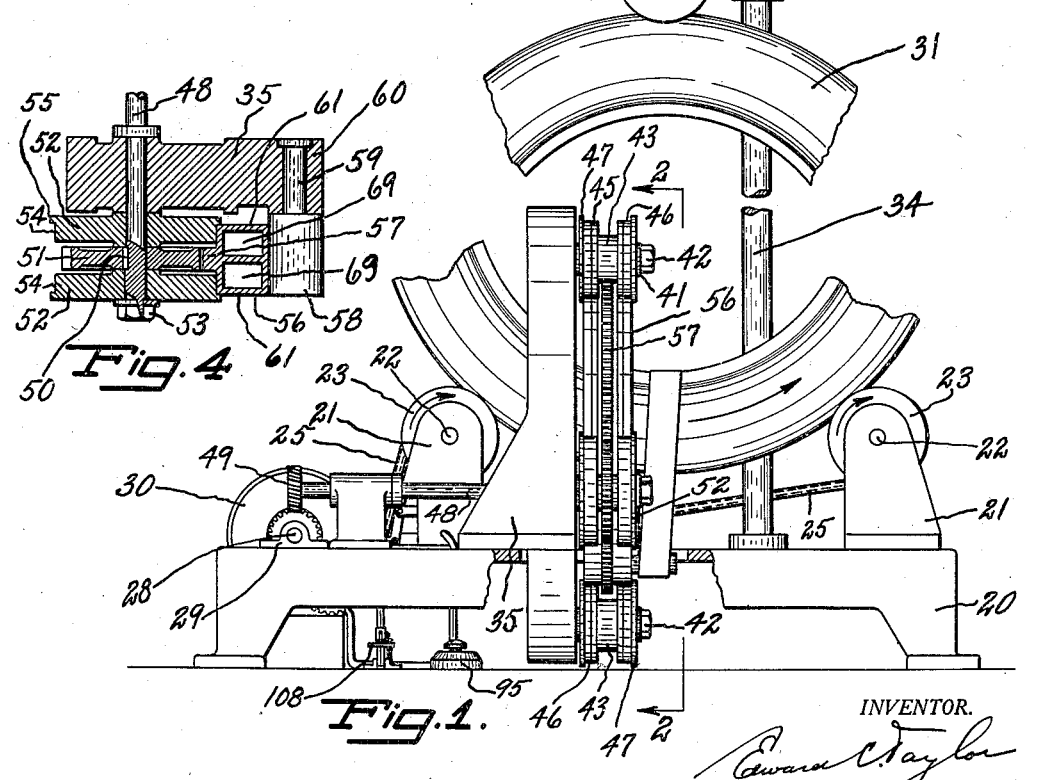
INVENTOR.
Edward C Taylor

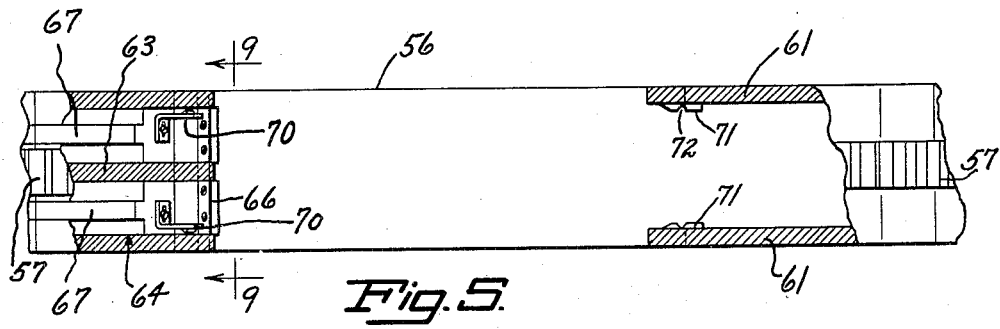
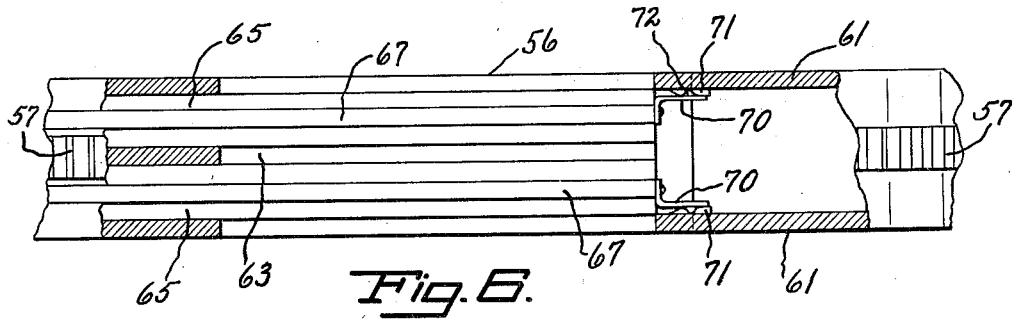
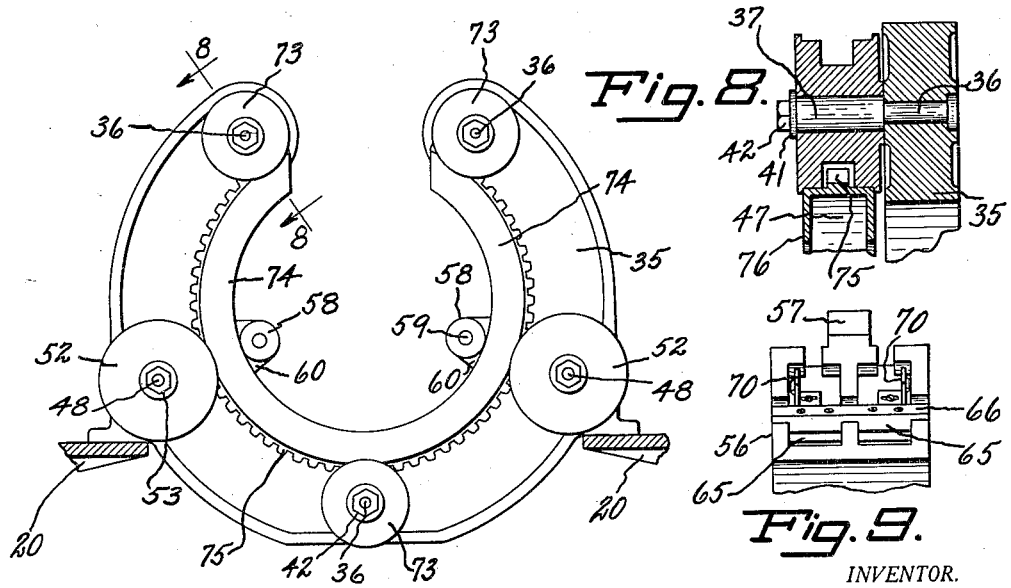

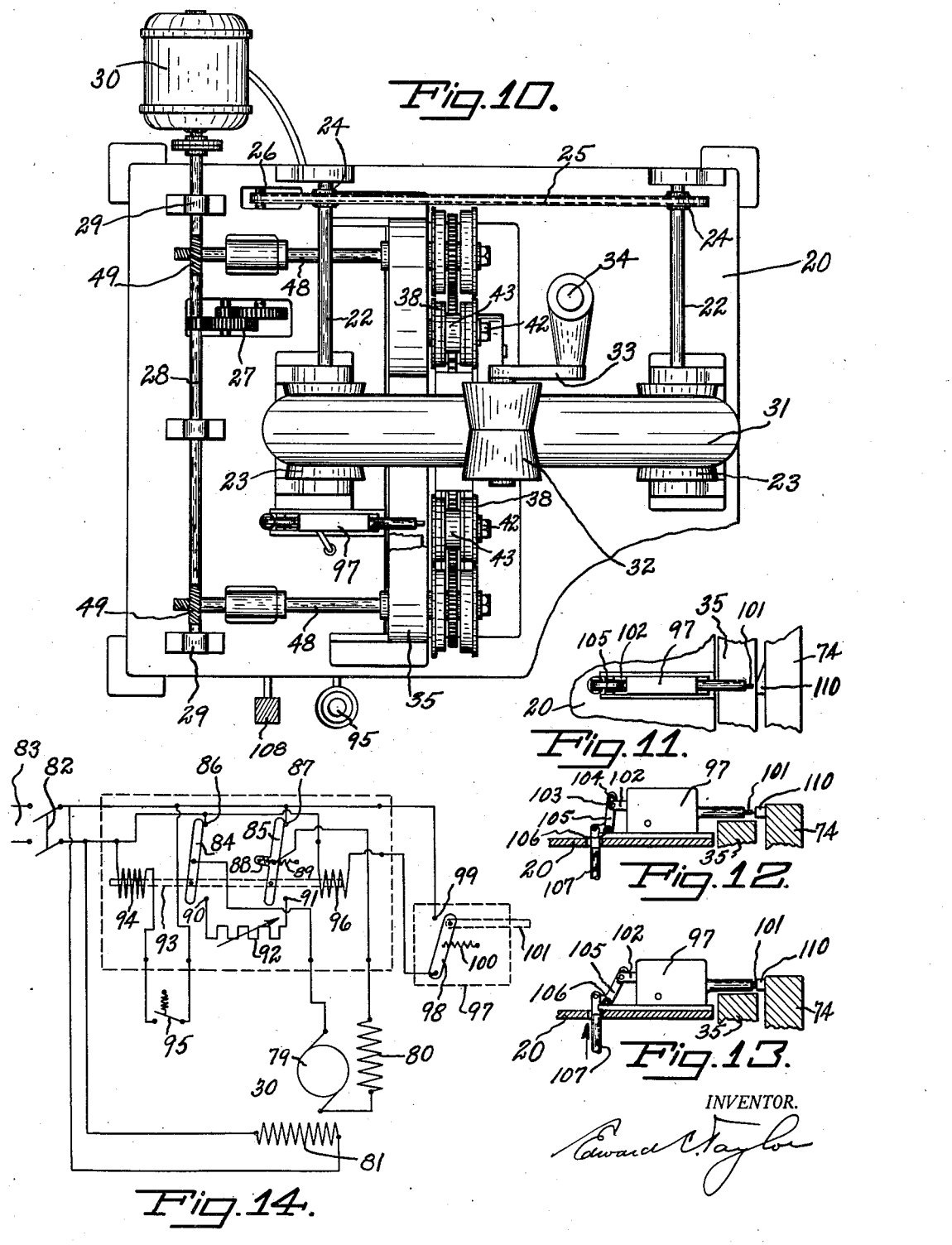

Patented Jan. 19, 1932

1,841,506

UNITED STATES PATENT OFFICE

EDWARD C. TAYLOR, OF LONGMEADOW, MASSACHUSETTS, ASSIGNOR TO THE FISK RUBBER COMPANY, OF CHICOPEE FALLS, MASSACHUSETTS, A CORPORATION OF MASSACHUSETTS

SHUTTLE MECHANISM FOR WRAPPING MACHINES

Application filed October 17, 1927. Serial No. 226,614.

This invention relates to machines for applying a helical wrapping of paper or the like to annular articles such as tires. In machines of this general character the paper is carried upon an annular shuttle through which the tire is threaded. Both the tire and the shuttle being circular in form, and the tire necessarily endless, it is necessary to make the shuttle with a gap through which the tire may be inserted or removed. In some commercial machines this gap is closed during the rotation of the machine by a so-called gate which makes the shuttle temporarily a complete annulus, in others the gap is left permanently open. In either type of machine, however, the shuttle must be turned to present the gap at a definite location in order to permit the passage of the tire into or out of the shuttle. Prior machines have been so constructed that the position of the shuttle when the machine was stopped was purely a matter of chance, and the operator was forced to rotate the shuttle manually to the desired angular position after the machine stopped. This operation was the hardest physical work connected with the operation of the wrapping machines, and both fatigued the workmen and slowed down the production of the machines.

It is one object of my invention to provide mechanism by which the shuttle will stop in a definite position of rotation whenever the machine is stopped. A further object is to provide a mounting and a drive for a shuttle which will reduce vibration to a minimum whether the shuttle be of the open gap or gate type. A further object is to provide a shuttle of the gate type in which the gate will be opened and closed automatically.

Referring to the drawings,

Fig. 1 is a side elevation of a conventional tire wrapping machine in which my invention has been embodied;

Fig. 2 is a side elevation of the shuttle support together with a shuttle of the gate type taken on line 2—2 of Fig. 1, and illustrating the manner in which I provide for opening and closing the gate automatically;

Fig. 3 is a section on line 3—3 of Fig. 2;

Fig. 4 is a section on line 4—4 of Fig. 2;

Fig. 5 is a top view, on an enlarged scale, of the gate type shuttle, showing the gate open;

Fig. 6 is a similar view showing the gate closed;

Fig. 7 is a view similar to Fig. 2, but showing a shuttle of the open gap type;

Fig. 8 is a section on line 8—8 of Fig. 7;

Fig. 9 is a detail on line 9—9 of Fig. 5;

Fig. 10 is a top plan view of the machine;

Fig. 11 is a detail of a stop switch shown in Fig. 10 with the shuttle support removed to show the coaction between the switch and the shuttle itself;

Fig. 12 is a side elevation of the switch;

Fig. 13 is a similar view showing the parts shifted into operative position; and Fig. 14 is an electrical wiring diagram.

I have illustrated my invention as applied to a machine of the usual type, and have omitted from the disclosure such standard details as are not necessary for an understanding of my improvements. The wrapping machine shown is mounted on a frame 20 from which rise brackets 21. These brackets carry shafts 22 bearing tire supporting and driving rolls 23 and sprockets 24. A chain 25 passing around sprockets 24 and another sprocket on a shaft 26 couple the rolls 23 for simultaneous rotation in the same direction. Gearing 27 joins shaft 26 to a power shaft 28 mounted in bearings 29 on the frame and coupled to an electric motor 30. The tire supporting rolls are preferably concaved as shown in Fig. 10 to centralize the tire sideways, and would in practice be adjustably mounted in order to accommodate tires of different sizes. The tire 31 is held against the driving rolls by a weight roll 32, preferably also concaved, carried in a swinging support 33 on a post 34 rising from the frame. Other conventional appliances may be added as desired, but the remainder of the description will be confined to my improved shuttle construction and to the drive of the machine.

Carried by the frame 20 is a shuttle support 35 in the general form of a circle but with an interruption through which the tire may be inserted or removed. The machine is designed to use either a shuttle with a sliding gate or one with an open gap. The former will be described first with particular reference to Figs. 2 to 6 and 9. The shuttle support carries studs 36 (here shown as three in number) each having a head countersunk in the shuttle support and bearing a sleeve 37. Freely rotatable on each sleeve is a two part roll formed of members 38 and 39, the former having a hub 40 upon which member 39 is applied with a press fit. A washer 41 fits over the end of the stud and bears against the end of sleeve 37, being held by a nut 42 on the stud to form a retaining means for the rolls 38 and 39 and to tighten stud 36 in the support 35. Freely rotatable upon the hub 40 is a roll 43 formed with a central groove 44 and side flanges 45. Members 38 and 39 are formed with bearing surfaces 46 and with side flanges 47. These parts form a portion of the bearing system for the outer surface of the shuttle, and their particular function will be pointed out more fully below.

Journaled in the shuttle support 35 and on the frame are a pair of shafts 48, coupled to the drive shaft 28 as by spiral gears 49. The shafts 48 are each keyed at 50 to gears 51 (Fig. 4) positioned in the central plane of the shuttle. Rolls 52 are mounted on both sides of each gear, being held in position on the shaft by a nut 53, and are provided with bearing surfaces 54 and flanges 55. Surfaces 46 of the first-mentioned rolls, and surfaces 54 of rolls 52 are tangent to the outer surface of the shuttle 56 and serve to support the shuttle for free rotation. The central zone of the outer circumference of the shuttle is formed with projecting gear teeth 57 which mesh with the two gears 51 and which pass through the central groove 44 of roll 43. The two gears 51 are spaced apart circumferentially of the shuttle a distance greater than the span of the gap so that the shuttle is always positively driven by at least one of the gears. Since the gears are driven in definitely timed relation to each other the teeth of one will always be ready to pick up the teeth of gear 57 after the gap has passed by. The mounting of the shuttle is completed by two or more rolls 58 mounted upon stub shafts 59 secured to inwardly extending lugs 60 on the shuttle support. The shuttle is guided both on its outer and inner circumferences and is held against lateral movement by the flanges 47 and 55. A very steady construction is thus provided which enables a high speed of rotation to be maintained with a minimum of vibration.

The shuttle 56 is provided with sidewalls 61 and for a portion of its circumference with a bottom wall. A central rib 63 divides that portion of the shuttle containing the bottom wall 61 into two parallel guideways or chambers 64 in which slide a pair of gates 65. The two gates are joined at one end by a plate 66 (Fig. 9) and each is formed with an outwardly extending rib 67 which passes through a slot in the outer circumference of the shuttle. These ribs serve both as guides for the gate and as continuations of the outer guiding periphery of the shuttle. They contact with the bearing surfaces 45 of rolls 43 and with the surfaces 54 of rolls 52, the former being separated from the main shuttle guiding rolls so as to permit a short individual motion of the gate at a position in the shuttle's rotation bringing the gate near the top. For purposes of lightness the gates are preferably cored as at 68.

If the shuttle is started into rotation in the direction of the arrow in Fig. 2 the inertia of the gate will cause it to lag behind the body of the shuttle, relative movement of the shuttle and gate being permitted by the double roll 38, 43 until the gate is finally stopped by the other end of the shuttle gap. A sudden stoppage of the shuttle will produce a reverse effect, the gate tending to remain in motion and moving into open position. To prevent jar during this gate opening movement the ends of the chambers 64 are made a running fit about the gates so that they serve as a pneumatic dash pot, small holes 69 in the ends of the chambers permitting the gates to settle smoothly and without jar into place. To hold the shuttle in closed position when the machine is running a latch is preferably provided, consisting in the case shown of spring members 70 on the gates fitted to catches 71 on the shuttle body. The interfitting portions 72 of the latch and catch are preferably rounded or generally triangular in form so that they may be released by a sudden pull on the gate such as would result from a quick stoppage of the shuttle with a consequent tendency of the gate to continue its motion.

The structure of the shuttle shown in Fig. 7 is generally similar except that no separate guiding rolls need to be used to permit independent rotation of a gate since none is used. The shuttle carrier 35 remains as before, as do the shafts 48, rolls 52, gears 51, and the internal guide rolls 58. The multiple guide rolls on studs 36 are, however, replaced by simple rolls 73 of the same general contour. The shuttle 74 is an integral member having a gear 75 on its outer circumference and formed with side flanges 76 which combine rigidity with lightness. The internal guide rolls 58 perform an especially useful function in the case of the open gap shuttle, preventing any tendency of the shuttle to pound as the gap goes around.

It will be understood that whatever type of shuttle is used it may be counterbalanced as is customary so that its tendency to vibrate during rotation is kept down. The paper roll 77 and the tension devices 78 have not been described in detail since they form a standard part of all machines of this type and do not directly affect my present invention.

I will now describe the means by which the shuttle may be stopped with the gap always in a predetermined position—in the case shown, with the gap at the top. This result is accomplished through the control of motor 30, the motor being geared positively to both the shuttle and the driving rolls 23. The motor has been shown in Fig. 14 as of the compound wound type, having an armature 79, a series field 80, and a shunt field 81, although other types may be used if desired. The shunt field 81 is connected directly through a main switch 82 to the line 83, and as this switch is not disturbed during the normal running of the machine the shunt field may be considered as permanently energized whether the motor is in motion or not. One side of the armature is joined to a contactor 84, and the other side, through the field 80, to a contactor 85. When the motor is running these contactors close the circuit to the line contact points 86 and 87. Each contactor is pivoted at its center and contactor 85 has an arm 88 to which a spring 89 is secured, acting in the manner of a toggle to hold the contactor in either one of its extreme positions. The other ends of contactors 84 and 85 are positioned to strike contact points 90 and 91 across which is connected a variable resistance 92 which short-circuits the motor armature when this contact is made. Both contactors 84 and 85 are joined to a rod 93 so that they move in unison.

One end of rod 93 passes into a solenoid 94 joined across the line through a switch 95, so that when the switch is closed the contactors are drawn into the position shown in Fig. 14, causing the motor to be started. The other end of the rod passes into a solenoid 96 joined across the line through a limit switch 97 mounted on the frame of the machine for reciprocation towards or away from the plane of the shuttle. This switch, as conventionally shown in Fig. 14, has a contact arm 98 normally held away from the contact point 99 by a spring 100, and a rod 101 projecting out of the switch by which it may be actuated. For the purpose of sliding the switch on the machine frame it is provided with lugs 102 through which passes a pin 103 fitting in a slot 104 in one arm of a bell crank 105 pivoted at 106 to the frame. A link 107 joins this bell crank to a treadle 108 pivoted at its center to the frame and normally held by a spring 109 so that the switch is backed away from the shuttle. When the treadle is depressed the rod 101 is projected into the path of a cam 110 placed on the side of the shuttle.

Assuming the machine to be engaged in wrapping a tire, the operator waits until the wrapping is completed and then depresses treadle 108. This in itself does nothing in the motor circuit, but places rod 101 in a position so that when cam 110 comes by the limit switch 97 is temporarily closed. Solenoid 96 is instantly actuated to throw contactors 84 and 85 out of contact with points 86 and 87, disconnecting the motor armature from the line, and into contact with points 90 and 91, short-circuiting the motor armature through resistance 92. The resulting action, known as dynamic braking, brings the motor to a quick stop in a time determined by the value of the resistance 92. Cam 110 is placed so that it strikes rod 101 a considerable interval—say half a revolution—before the shuttle is in the desired position for stoppage, and resistance 92 is adjusted so that the speed of deceleration of the motor is just enough to bring the shuttle to rest with the gap at the top. The action, although fast, is without shock or jar.

If the shuttle of the open gap type is used the wrapped tire may now be removed without any resetting of the shuttle by hand. If a closed gap, or gate type, shuttle is used the gate will have to be opened by hand unless the automatic gate which I have described is employed. With the automatic gate the speed of stoppage of the dynamic brake works admirably, as the shuttle is checked quickly and the momentum of the gate given full chance to loosen the latch mechanism and move the gate to fully open position before the shuttle stops.

While I have described the mechanism in its preferred forms with considerable detail, I believe that I am the first to provide mechanism for stopping a high speed wrapping shuttle in a predetermined position, and to open and close the gate of a shuttle automatically. I therefore desire to claim mechanism for performing these novel functions broadly, and recognize that numerous changes may be made in the mechanical and electrical structure without departing from the principle of my invention.

Having thus described my invention, I claim:

1. In a machine for wrapping annular articles, a rotatable shuttle, an electric motor positively geared to the shuttle, a cam on the shuttle, a limit switch, means under the control of the operator for shifting the limit switch into position to be actuated by the cam, and an electrical control circuit actuated by the limit switch for dynamically braking the electric motor.

2. In a machine for wrapping annular articles, a rotatable shuttle having a gap therein, and a cap closing gate circumferentially slidable in the shuttle.

3. In a machine for wrapping annular articles, a rotatable shuttle having a gap therein, a gap closing gate circumferentially slidable in the shuttle, and means for starting and stopping the rotation of the shuttle with an abruptness sufficient to cause automatic actuation of the gate.

4. In a machine for wrapping annular articles, a rotatable shuttle having a gap therein, means for rotating the shuttle, and a gap closing gate circumferentially slidable in the shuttle under the influence of its inertia relative to the shuttle.

5. In a machine for wrapping annular articles, a rotatable shuttle having a gap therein, means for rotating the shuttle, a gap closing gate circumferentially slidable in the shuttle under the influence of its inertia relative to the shuttle, and a catch normally holding the gate closed but releasable by the stoppage of the shuttle.

6. In a machine for wrapping annular articles, a rotatable shuttle having a gap therein, means for rotating the shuttle and a gap closing gate slidable in a cavity formed in the shuttle under the influence of its inertia relative to the shuttle, the gate being so fitted in the cavity that an air cushion is formed between the end of the gate and the end of the cavity to absorb the shock as the gate is opened.

7. In a machine for wrapping annular articles, a rotatable shuttle, an electric motor positively geared to the shuttle, a cam on the shuttle, a limit switch, means under the control of the operator for shifting the limit switch into position to be actuated by the cam and an electrical control circuit actuated by the limit switch for dynamically braking the electric motor, said circuit including a variable resistance to control the extent of the braking action.

EDWARD C. TAYLOR.